April 14, 1959  F. H. GOODING  2,882,491
APPARATUS FOR TESTING ELECTRIC CABLE INSULATION
Filed Feb. 5, 1957

INVENTOR
Francis H. Gooding
BY
James C. Bethell
ATTORNEY

United States Patent Office 2,882,491
Patented Apr. 14, 1959

2,882,491

APPARATUS FOR TESTING ELECTRIC CABLE INSULATION

Francis Herbert Gooding, Lodi, N.J., assignor to The Okonite Company, Passaic, N.J., a corporation of New Jersey Application February 5, 1957, Serial No. 638,348

7 Claims. (Cl. 324—54)

This invention relates to the ionization-testing of the insulation of electric wires and cables and has for one of its objects to provide an apparatus for detecting the presence in the insulation of voids or other defects which may cause eventual breakdown and failure when the wire or cable is operated at its rated voltage.

In one embodiment of my invention, the insulation is wrapped or otherwise covered with a semi-conducting layer, such, for example, as a semi-conducting tape, and is drawn through a tank of insulating liquid, such as oil. A high-voltage electrode, such as contactors connected to a high-voltage source, is provided midway of the tank and engages the semi-conducting covering of the insulation being tested as the wire or cable is advanced through the insulating fluid in the tank. Suitable contactors are provided at each end of the tank. A suitable device is connected to the electrode, so that, as the wire or cable advances, the ionization characteristics of the insulation may be observed continuously.

In another embodiment of my invention, the semi-conducting layer over the insulation is omitted and instead the wire or cable is drawn through a semi-conducting tube, which is directly connected to a high-voltage source.

Figure 1:
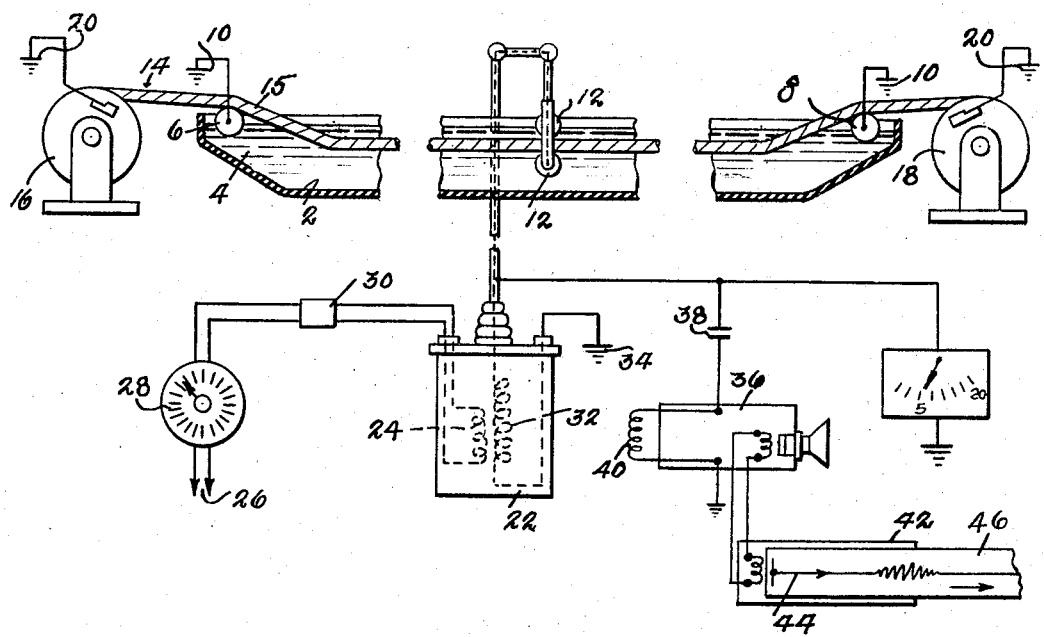
Figure 2:
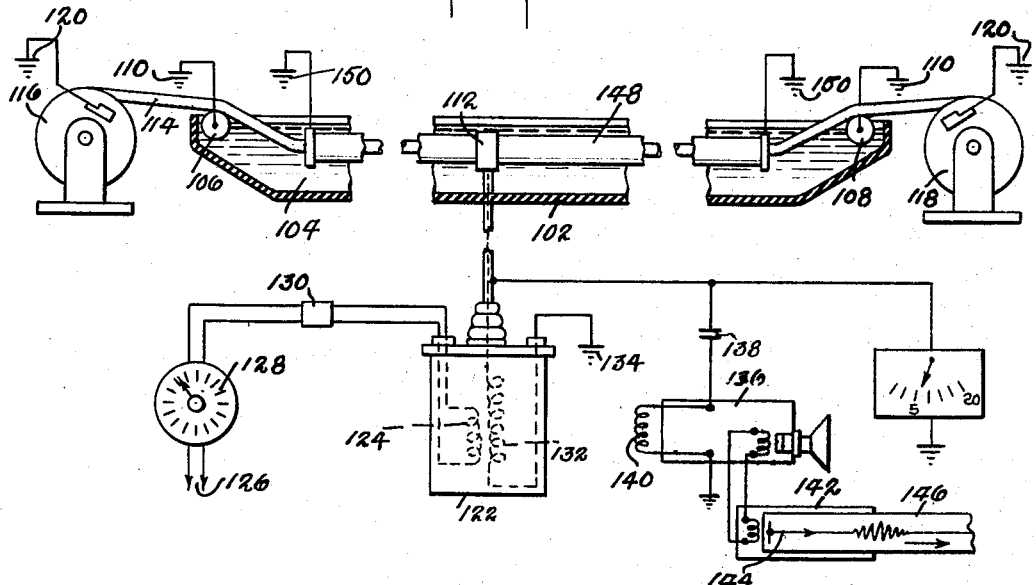

In the accompanying drawings,

Fig. 1 shows in partial section a lay-out of one embodiment of my invention; and Fig. 2 is a similar view of another embodiment.

Referring to the first embodiment of my invention, 2 designates an open tank containing an insulating liquid 4, such as oil, for example. Mounted on the tank, within the insulating liquid 4, is a plurality of contactors 6 and 8, one at each end of the tank. These contactors are grounded, as shown at 10. Midway of the length of the tank 2 I provide a plurality of contactors 12, which constitute an electrode in that they are connected to a high-voltage source, as will be explained more in detail hereinafter.

14 designates an insulated wire or cable to be tested. This wire or cable is covered with a semi-conducting layer 15 and is taken from a let-off reel 16, led over grounded contactor 6, through the insulating liquid 4 in the tank 2, between the contactors 12 of the electrode, and from thence over contactor 8 to a wind-up reel 18. The conductor of the wire or cable is grounded at the reels 16 and 18, as shown at 20.

22 designates a transformer, the primary winding 24 of which receives its energy from a 60-cycle power source 26. 28 and 30 designate, respectively, a current regulator and circuit breaker in the line to the transformer primary. The secondary of the transformer is designated 32, and one side of this winding is connected to ground, as shown at 34, while the other side is connected to the contactors 12.

36 designates an aural device in the form of a radio receiver, by which the ionization characteristics of the insulation of the wire or cable 14 may be observed continuously, this receiver being connected through corona-free condenser 38 between ground and that side of the transformer secondary which is connected to the electrode contactors 12. The charging current of the condenser 38 is by-passed around the receiver 36 by connecting a small inductor 40 across the receiver terminals. The inductance of inductor 40 is sufficient to present a high impedance to the high-frequency corona currents but only a low impedance to the 60-cycle power current passing through the high-voltage condenser 38, so that the receiver will respond only to the high-frequency corona voltage which is generated in the wire or cable when corona is initiated in a void.

Connected to the output of the recever 36 is a visual recording device, such as a galvanometer 42. The stylus and cooperating recording tape of this recorder are designated 44 and 46, respectively.

In operating my improved apparatus, the regulator 28 is set so that the voltage at the surface of the cable insulation at the contactors 12 is not less, preferably higher, than the rated operating voltage of the wire or cable. For example, if the rated operating voltage is 12,000 volts, I prefer to set the regulator for a voltage at the contactors 12 of, say, 18,000 volts.

It will be apparent that, as the wire or cable 14 with its semi-conducting layer or wrapping 15 is continuously advanced from the let-off reel 16 to the take-up reel 18, its insulation will be subjected progressively to a dielectric stress, which reaches its maximum at the electrode contactors 12, the stress progressively decreasing thereafter until the discharge end of the apparatus is reached. The receiver 36 will indicate aurally and continuously, and the recorder 42 will record continuously the ionization characteristics of the insulation, so that any variation in the dielectric stress caused by the sudden ionization or local breakdown of an imperfection in the insulation which would eventually cause failure of the wire or cable at its rated operating voltage can be observed.

It is to be understood that, if so desired, either one of the devices 36 and 42 may be omitted.

In the embodiment of the invention illustrated in Fig. 2, 102 designates a tank containing an insulating liquid 104, such as oil, for example. Mounted within the tank 102 are contactors 106 and 108, one at each end of the tank. These two contactors are grounded at 110. Mounted within the tank 102 is a tube 148 of semi-conducting material, such as a suitable plastic in which carbon particles are dispersed. The tube is grounded at each end, as shown at 150.

The insulated wire or cable to be tested is designated 114, and it is taken off let-off reel 116, passed through the tank 102 and the semi-conducting tube 148 to the take-up reel 118. The conductor of the wire or cable is grounded at the reels 116 and 118 as shown at 120.

122 designates a transformer, the primary winding 124 of which receives its energy from a 60-cycle power source 126. 128 and 130 designate, respectively, a current regulator and a circuit breaker in the line to the primary winding. The transformer secondary is designated 132, and one side of the secondary is grounded at 134.

The semi-conducting tube 148 is provided with a conducting collar or electrode 112 of metal or other conducting material, and the side of the transformer secondary 132 opposite the grounded side is connected to this collar.

Connected through a high-voltage, corona-free condenser 138 between ground and that side of the transformer secondary which is connected to collar or electrode 112 is an aural device in the form of a radio receiver 136. The charging current of the condenser 138 is by-passed around the receiver 136 by connecting an inductor 140 across the receiver terminals. The inductance of 140 is sufficient to present a high impedance to the high-frequency corona currents but only a low impedance to the 60-cycle power current passing through the high-voltage condenser 138, so that the receiver will respond only to the high-frequency corona voltage which is generated in the cable when corona is initiated in a void.

Connected to the output of the receiver 136 is a visual recording device, such as a galvanometer 142, the stylus of which is designated 144, while 146 designates the co-operating recording tape.

While I have shown two devices—136 and 142—it is to be understood that either of these devices may be used alone, if desired.

It will be appreciated that, as the wire or cable 114 is passed through the improved apparatus of Fig. 2, the insulation of the wire or cable will be subjected progressively to a dielectric stress, which reaches maximum at the electrode 112, the stress progressively decreasing thereafter until the discharge end of the apparatus is reached. It will be appreciated also that, during the passage of the wire or cable 114, the receiver 136 and the recorder 142 will continuously indicate aurally and record visually, respectively, the ionization characteristics of the insulation of the wire or cable, so that any variation in the dielectric stress caused by the sudden ionization or local breakdown of an imperfection in the insulation which would eventually cause failure of the wire or cable at its rated operating voltage can be observed.

It is to be understood that changes may be made in the details of construction and arrangement of parts hereinabove described without departing from the spirit and scope of my invention.

What I claim is:

1. Apparatus for the ionization-testing of electric wire and cable insulation, said apparatus comprising, in combination, a tank containing an insulating fluid; means for continuously advancing an insulated wire or cable, having its conductor grounded and its insulation enclosed in a semi-conducting layer, through said insulating fluid; a plurality of grounded electric contactors disposed within and along said tank in contact with said insulating fluid and adapted to be engaged by said semi-conducting layer as the wire or cable progresses through said insulating fluid; a high-voltage source, one side of which is connected to one of said electric contactors substantially midway of the tank, the other side of the high-voltage source being grounded; and an electrically operated indicating device connected between ground and that side of the high-voltage source which is connected to a contactor, for continuously indicating the ionization characteristics of the insulation of the advancing wire or cable.

2. Apparatus for the ionization-testing of electric wire and cable insulation, said apparatus comprising, in combination, a tank containing an insulating liquid; means for continuously advancing an insulated wire or cable, having its conductor grounded and its insulation enclosed in a semi-conducting layer, through said insulating liquid; a plurality of grounded electric contactors disposed within and along said tank in contact with said insulating liquid and adapted to be engaged by said semi-conducting layer as the wire or cable progresses through said insulating liquid; a high-voltage source, one side of which is connected to one of said contactors substantially midway of the tank, the other side of the high-voltage source being grounded; and an electrically operated indicating device connected between ground and that side of the high-voltage source which is connected to a contactor, for continuously indicating the ionization characteristics of the insulation of the advancing wire or cable.

3. Apparatus for the ionization-testing of electric wire and cable insulation, said apparatus comprising, in combination, a tank containing an insulating fluid; means for continuously advancing an insulated wire or cable, having its conductor grounded and its insulation enclosed in a semi-conducting layer, through said insulating fluid; a plurality of grounded electric contactors disposed within and along said tank in contact with said insulating fluid and adapted to be engaged by said semi-conducting layer as the wire or cable progresses through said insulating fluid; a high-voltage transformer, one side of the secondary of which is connected to one of said contactors substantially midway of the tank, the other side of the transformer secondary being grounded; and an electrically operated indicating device connected between ground and that side of the transformer secondary which is connected to a contactor, for continuously indicating the ionization characteristics of the insulation of the advancing wire or cable.

4. Apparatus for the ionization-testing of electric wire and cable insulation, said apparatus comprising, in combination, a tank containing an insulating fluid; means for continuously advancing an isulated wire or cable, having its conductor grounded and its insulation covered with a semi-conducting layer, through said insulating fluid; a plurality of grounded electric contactors mounted within said tank in contact with said insulating fluid, said contactors being so relatively disposed that substantially the entire surface of said semi-conducting layer will be contacted as the wire or cable progresses through said insulating fluid; a high-voltage source, one side of which is connected to one of said contactors substantially midway of the tank, the other side of the high-voltage source being grounded; and an electrically operated indicating device connected between ground and that side of the high-voltage source which is connected to a contactor, for continuously indicating the ionization characteristics of the insulation of the advancing wire or cable.

5. Apparatus for the ionization-testing of electric wire and cable insulation, said apparatus comprising, in combination, a tank containing an insulating fluid; means for continuously advancing an insulated wire or cable, having its conductor grounded and its insulation covered with a semi-conducting layer, through said insulating fluid; a plurality of grounded electric contactors mounted within said tank in contact with said insulating fluid, said contactors being so relatively disposed that substantially the entire surface of said semi-conducting layer will be contacted as the wire or cable progresses through said insulating fluid; a high-voltage source, one side of which is connected to one of said contactors substantially midway of the tank, the other side of the high-voltage source being grounded; and an electrically operated recording device connected between ground and that side of the high-voltage source which is connected to a contactor, for continuously recording the ionization characteristics of the insulation of the advancing wire or cable.

6. Apparatus for the ionization-testing of electric wire and cable insulation, said apparatus comprising, in combination, a tank containing an insulating fluid; a semi-conducting tube within said tank, said tube being grounded at each end and provided intermediate its ends with a conducting collar; means for advancing an insulated wire or cable, having its conductor grounded, through said fluid and tube; a high-voltage source, one side of which is connected to said conducting collar, the other side of the high-voltage source being grounded; and an electrically operated indicating device connected between ground and that side of the high-voltage source which is connected to said conducting collar, for indicating continuously the ionization characteristics of the insulation of the advancing wire or cable.

7. Apparatus for the ionization-testing of electric wire and cable insulation, said apparatus comprising, in combination, a tank containing an insulating fluid; a semi-conducting tube within said tank, said tube being grounded at each end and provided intermediate its ends with a conducting collar; means for advancing an insulated wire or cable, having its conductor grounded, through said fluid and tube; a high-voltage transformer having one side of its secondary connected to said conducting collar, the other side of its secondary being grounded; and an electrically operated recording device connected between ground and that side of the transformer secondary which is connected to said tube, for recording continuously the ionization characteristics of the insulation of the advancing wire or cable.

References Cited in the file of this patent

UNITED STATES PATENTS

| | | |
|---|---|---|
| 2,460,107 | Slade | Jan. 25, 1949 |
| 2,794,170 | Gooding | May 28, 1957 |